United States Patent [19]
McDonald

[11] Patent Number: 5,471,757
[45] Date of Patent: Dec. 5, 1995

[54] OIL FILTER SIZE DETERMINATION KIT

[76] Inventor: Randolph C. McDonald, 6922 Sunbelt Dr. E., San Antonio, Tex. 78218

[21] Appl. No.: 236,450

[22] Filed: May 2, 1994

[51] Int. Cl.⁶ .............................. G01B 3/30; G01B 3/48
[52] U.S. Cl. ...................... 33/501.45; 33/542; 33/199 R
[58] Field of Search ........................... 33/501.45, 501.05, 33/501.08, 501.09, 501.7, 501.11, 501.12, 600, 542, 555.1, 567, 544.5, 545, 562, 199 R

[56] References Cited

U.S. PATENT DOCUMENTS

| | | | |
|---|---|---|---|
| 318,051 | 5/1885 | Starrett | 33/199 R |
| 552,238 | 12/1895 | Darling | 33/199 R |
| 987,703 | 3/1911 | Curtin | 33/199 R |
| 1,107,276 | 8/1914 | Farrington | 33/199 R |
| 1,465,920 | 8/1923 | Francis | 33/542 |
| 1,721,600 | 7/1929 | Leschen | 33/542 |
| 2,715,281 | 8/1955 | Black | 33/501.45 |
| 4,329,783 | 5/1982 | Maresca | 33/542 |
| 4,987,768 | 1/1991 | Dimmick et al. | 33/542 |
| 5,042,161 | 8/1991 | Hodge | 33/501.45 |

*Primary Examiner*—Christopher W. Fulton

[57] ABSTRACT

The invention is of a thread indication kit for use in determining the specification diameter and thread density of a threaded in-take orifice of a spin-on filter, such as the traditional oil filter used in motor vehicles. The kit includes a groups of sizing tabs, each of which includes a sizing lobe. The sizing lobe is a blade-like member with parallel and spaced edges separated by a distance which corresponds to the thread crest-to-thread crest distance of diametrically opposed points within an in-take orifice of an oil filter. Displayed on each sizing tab is indicia which indicates the specification diameter of the intake orifice which exhibits the thread crest-to-thread crest distance corresponding to the lobe dimension of the sizing tab. Applicant's kit also includes a thread gauge which is used to determine the thread density of threaded orifices. The combination of specification in-take orifice diameter and thread density allows one to properly replace a spin-on filter (at least with respect to proper fitting at the in-take orifice) having only the to-be-replaced filter as a guide.

4 Claims, 2 Drawing Sheets

5,471,757

OIL FILTER SIZE DETERMINATION KIT

BACKGROUND OF THE INVENTION

1. Field of The Invention

Applicant's invention relates to measurement devices, and more specifically to measurement devices useful in determining the size and thread spacing of threaded orifices.

2. Background Information

A common problem with respect to vehicle and heavy equipment maintenance relates to using appropriate oil filters when changing engine oil, transmission fluids, hydraulic fluids and related lubricating or force transmission fluids. While it may seem that merely providing to the filter supplier the stock number of the filter already on the equipment, or referring to some technical manual would provide the information necessary to always insure proper filter replacement, such is quite often not the case. Oil filters are by necessity in locations on most engines where they accumulate dirt and grime which obscure the part or model number, and/or are often exposed to conditions which abrade or otherwise lead to the removal of the painted characters or label which indicates the model or part number. This problem is exacerbated by the frequent lack of technical manual references for older or less common vehicles or equipment. Further still, even if the owner of the vehicle or equipment has the appropriate model or part number for the intended filter, the supplier may not have the filter in stock, and an alternative may be needed.

Some or all of the above-described circumstances will necessitate a determination of appropriate filter size solely by reference to the existing filter. One critical aspect of this determination, and one which proves quite difficult by mere visual inspection, is determining the diameter and thread distribution of any spin-on filter's threaded intake orifice. Choosing precisely the correct diameter and thread distribution for a spin-on filter is absolutely crucial. Even a slight variation from the proper specification may result in an imperfect seal between the filter and the equipment, with a loss in oil leading to potential catastrophic mechanical failure. Also, a mis-match of thread sizes may "strip" the threads of the filter stud on the equipment's filter manifold which, in turn, will require costly repairs and delay in further use of the vehicle or equipment.

Part of the difficulty in determining the diameter of the intake orifice of an oil filter lies in the fact that the diameter is not that which may be seen through mere visual inspection. This is true because the reported intake orifice diameter of an oil or other spin-on filter is the distance between diametrically opposed points on thread trough bottoms, not the more easily observed distance between opposite thread crests.

Another obstacle to correct assessment of oil filter specifications lies in the subtle differences between differing thread distributions, differences which incrementally vary in mere hundredths of inches in relative spacing of threads.

A need exists for means by which one can reliably determine the orifice diameter and thread distribution of the intake orifice of any spin-on filter in the absence of which are created circumstances leading, at worse, to equipment and vehicle maintenance problems, and, at least, to time consuming investigations for properly fitting replacement filters.

SUMMARY OF THE INVENTION

In accordance with the foregoing, it is an object of the present invention to provide a novel kit through the use of which one can easily and accurately determine the diameter and thread distribution of the intake orifice of a spin-on filter.

It is another object of the present invention to provide a novel method for determining the diameter and thread distribution of the intake orifice of a spin-on filter.

In satisfaction of these and related objectives, Applicant's present invention provides a kit which includes a plurality of sizing tabs for measuring the diameter of the intake orifice of a spin-on filter. Applicant's kit also includes a thread gauge to ascertain the thread spacing of the filter's intake orifice. Applicant's invention permits its practitioner to determine the diameter and thread distribution of the intake orifice of a spin-on filter without the benefit of reference to a technical manual or filter model or part number.

DETAILED DESCRIPTION OF THE PREFERRED EMBODIMENT

Figure 1:
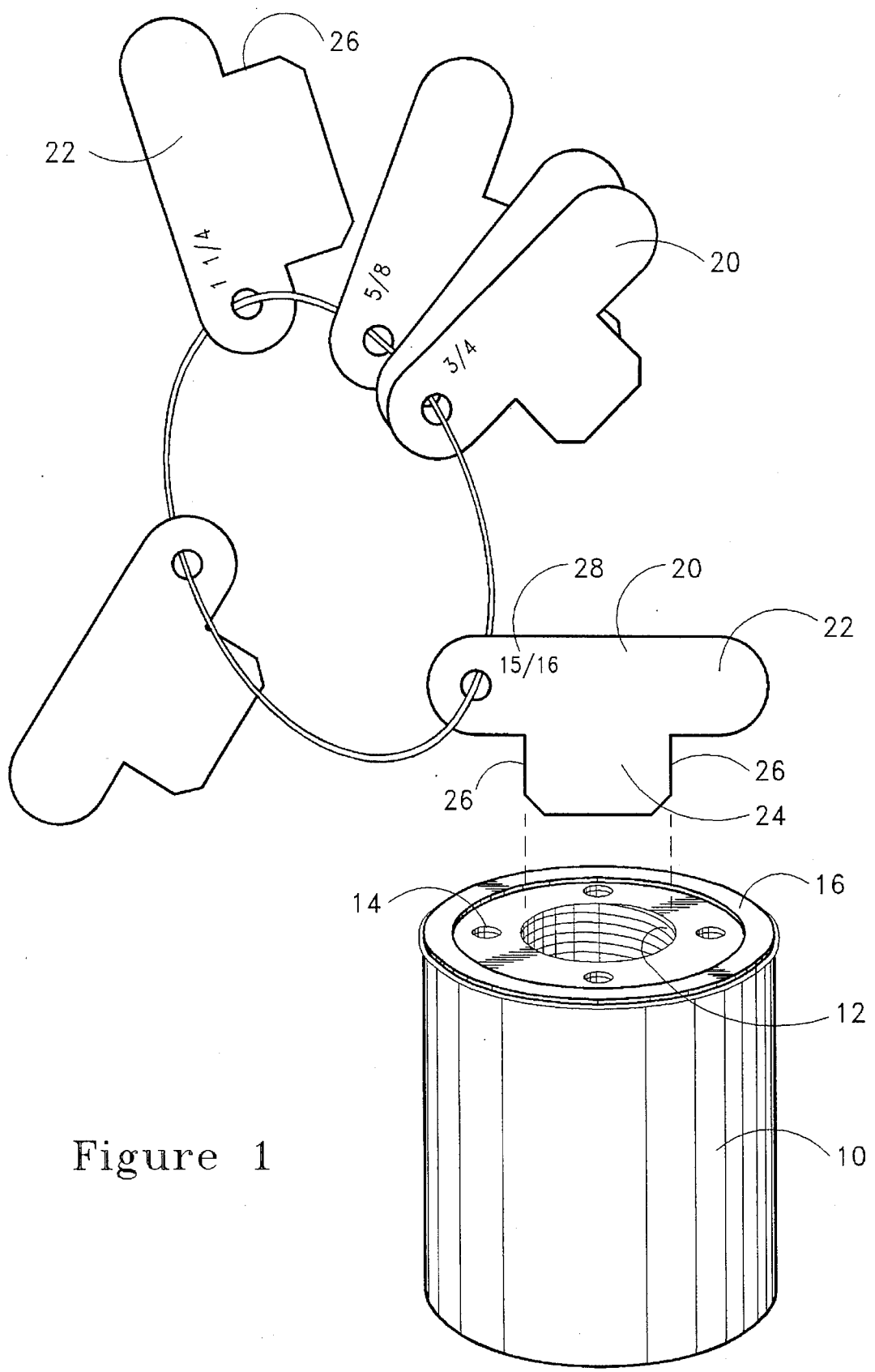
FIG. 1 is a perspective of a typical oil filter with one of Applicant's sizing tabs positioned for insertion into the intake orifice of the filter for determining the precise orifice diameter for the filter.

Referring to FIG. 1, a typical spin-on oil filter is identified by the reference numeral 10. Such a filter 10 has an intake orifice 12, return orifices 14 and a gasket 16 which encircles orifices 12 and 14 to help seal the filter 10 against a filter manifold of an engine (not shown in the drawings).

Referring still to FIG. 1, the filter size determination kit of Applicant's invention includes a plurality of sizing tabs 20. Each tab 20 includes a handle portion 22 from which projects a sizing lobe 24. Sizing lobe 24 is an elongate, flat, blade-like member with parallel and spatially separated abutment edges 26. Each tab 20 includes some indicia 28 which either directly or indirectly indicates the distance between abutment edges 26.

Figure 2:
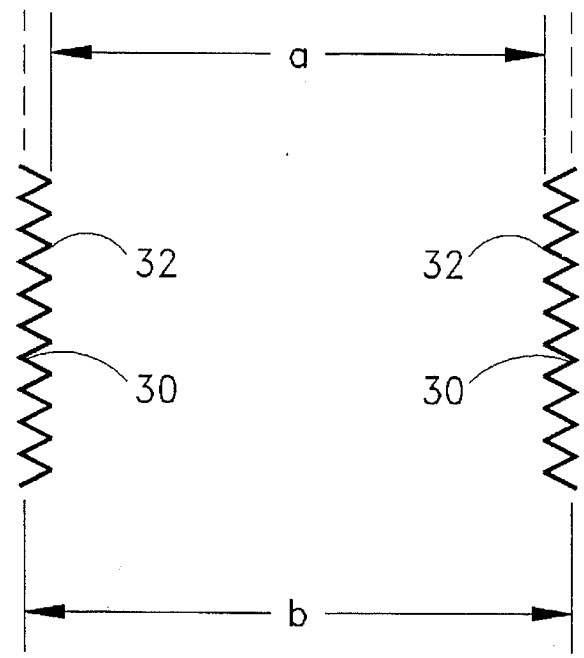
FIG. 2 is a sagittal sectional representation of the distances between thread crests and troughs, segment a representing the distance between diametrically opposed points on thread crests (which corresponds to the length of a corresponding sizing lobe on one of Applicant's sizing tabs) and with segment b representing the distance between diametrically opposed points on thread troughs (the diameter actually reported in the filter specification).

Referring in combination to FIGS. 1 and 2, the distance between diametrically opposed points on thread troughs 30 (segment b of FIG. 2) is the diameter which is reported for spin-on filters. However, the distance between diametrically opposed points on thread crests 32 (segment a of FIG. 2) is the distance which is more easily measured, whatever method is employed.

The respective sizing lobes 24 of Applicant's sizing tabs 20 correspond to distances (or diameters) represented by segment a of FIG. 2 for each of numerous spin-on filters. The indicia 28 of each sizing tab, however, indicates the distance (or diameter) corresponding to segment b of FIG. 2 which is the specification diameter of the in-take orifice of the appropriate replacement filter. Therefore, when the sizing tab 20 is selected for a particular filter 10, indicia 28 will indicate the specification diameter of orifice 12, although the distance actually measured is the lesser distance corresponding to segment a of FIG. 2.

Using Applicant's sizing tabs 20 is a matter of simply selecting the sizing tab 20 from the set of tabs 20 provided with Applicant's kit which will snugly slide into orifice 12 at precisely a bisecting line of the orifice 12. If a sizing tab 20 will not pass into orifice 12 at any point, a tab 20 having a smaller sizing lobe 24 must be tried. If the sizing lobe 24 can move longitudinally when inserted into orifice 12, a tab 20 having a larger sizing lobe 24 must be tried. Once the tab 20 which has the sizing lobe 24 which will slide snugly into orifice 12 along a bisecting line is selected, reading the indicia 28 displayed thereon will inform the user of the specification diameter of orifice 12.

Figure 3:
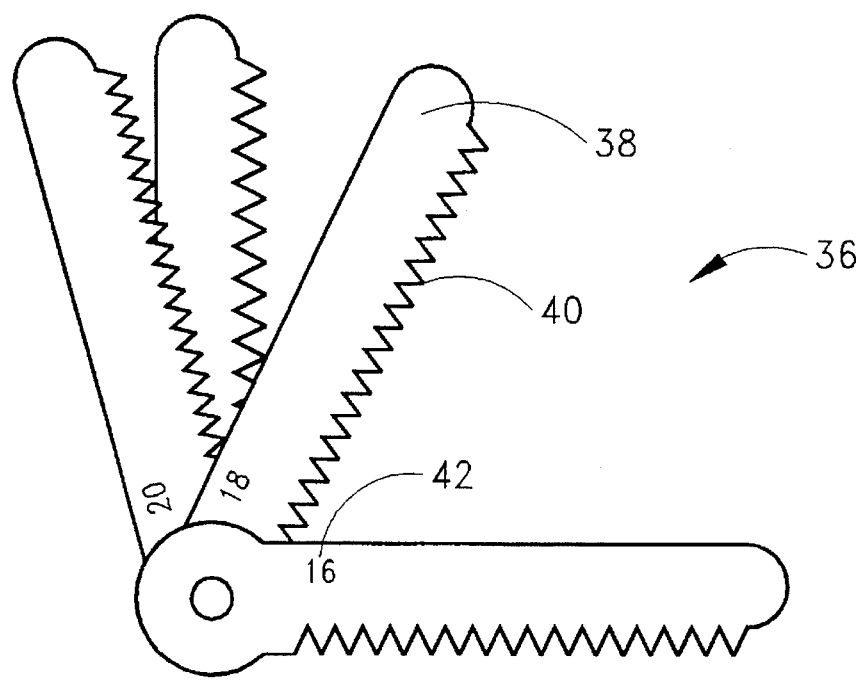
FIG. 3 is a perspective view of a thread gauge which is incorporated into Applicant's kit and used in Applicant's method.

Once the specification orifice 12 of a particular filter 10 is determined, then only the thread density must be measured. Referring to FIG. 3, this determination is made using a thread gauge 36. Thread gauge 36 include a number of blades 38, each of which exhibit serrations 40 in shapes and densities which correspond to or "mirror" certain thread configurations used in a variety of spin-on filters. Finding the blade 38 whose serrations 40 precisely mate with the threads of orifice 12 of a filter 10 will indicate the thread density of a particular filter 10's orifice 12. Thread density indicia 42 is presented on each blade 38 to indicate the thread density which corresponds to the serrations 40 of each blade 38.

Once having determined the precise diameter and thread density of orifice 12 of a particular filter 10, a properly fitting replacement filter can be easily selected by the supplier. Using Applicant's kit and method will, at the very least, eliminate many duplicate trips to supply houses for returning mis-matched filters. More importantly, selecting proper replacement filters will eliminate mechanical problems associated with improper filter selection, such as the potential oil leakage and thread damage mentioned earlier.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An oil filter identification kit comprising:

a plurality of sizing tabs, each said sizing tab having a sizing lobe with first and second abutment edges disposed at opposite sizing lobe ends of said sizing lobe, each said first and second lobe ends of each said sizing lobe of each said sizing tab being spaced apart over a linear distance which linear distance for each said sizing tab's sizing lobe is distinct from other said sizing tabs in said kit, each said sizing tab having indicia displayed thereon which indicates a specification diameter of a threaded oil filter in-take orifice for which said sizing tab is configured to identify, namely an oil filter in-take orifice having a corresponding thread tip to thread tip diameter which is substantially equal to said linear distance.

2. The kit of claim 1 further including a thread gauge configured for measuring thread density of said threaded oil filter in-take orifice.

3. A method for determining the specification diameter of the in-take orifice of an oil filter comprising the steps of:

selecting a plurality of sizing tabs, each said sizing tab having a sizing lobe with first and second abutment edges disposed at opposite sizing lobe ends of said sizing lobe, each said first and second lobe ends of each said sizing lobe of each said sizing tab being spaced apart over a linear distance which linear distance for each said sizing tab's sizing lobe is distinct from other said sizing tabs in said kit, each said sizing tab having indicia displayed thereon which indicates a specification diameter of a threaded oil filter in-take orifice for which said sizing tab is configured to identify, namely an oil filter in-take orifice having a corresponding thread tip to thread tip diameter which is substantially equal to said linear distance;

measuring said specification diameter by attempting to insert said sizing lobe of a first said sizing tab into said threaded orifice and, if said sizing lobe snugly mates with said threaded orifice substantially at a bisecting line of said threaded orifice, reading said indicia to determine said specification diameter, but, if said sizing lobe is too large to pass into said threaded orifice, or is of a size which allows longitudinal movement of said sizing lobe when inserted into said threaded orifice, then repeated said measuring by selecting successive said sizing tabs until one said sizing lobe of one said sizing tab is sized whereby said lobe snugly fits into said orifice along said bisecting line.

4. The method of claim 3 further comprising the determination of thread density of said threaded orifice and comprising the additional steps of:

selecting a thread gauge, said thread gauge having a plurality of serrated blades, each said blade having serrations which are shaped and respectively spaced to mirror threads of a threaded orifices of varying thread densities, each said blade having thread density indicia for indicating thread density which corresponds to thread density mirrored by said serrations; and successively attempting to mate with threads of said threaded orifice said serrations of each of several said blades until one blade is selected which most precisely mates with said threads of said threaded orifice, and upon selecting said blade whose serrations most closely mirror said threads of said threaded orifice, reading said thread density indicia.

* * * * *